Nov. 8, 1960 P. JOHNSON ET AL 2,959,260
DUAL CONTROL SYSTEM FOR CRANES AND THE LIKE
Filed Oct. 17, 1955 8 Sheets-Sheet 1

INVENTOR.
PAUL JOHNSON
ROY H. ZEILMAN
BY
Oberlin, Maky & Donnelly
ATTORNEYS

Nov. 8, 1960 P. JOHNSON ET AL 2,959,260
DUAL CONTROL SYSTEM FOR CRANES AND THE LIKE
Filed Oct. 17, 1955 8 Sheets-Sheet 2

INVENTORS
PAUL JOHNSON AND
ROY H. ZEILMAN
BY
Oberlin + Limbach
ATTORNEYS.

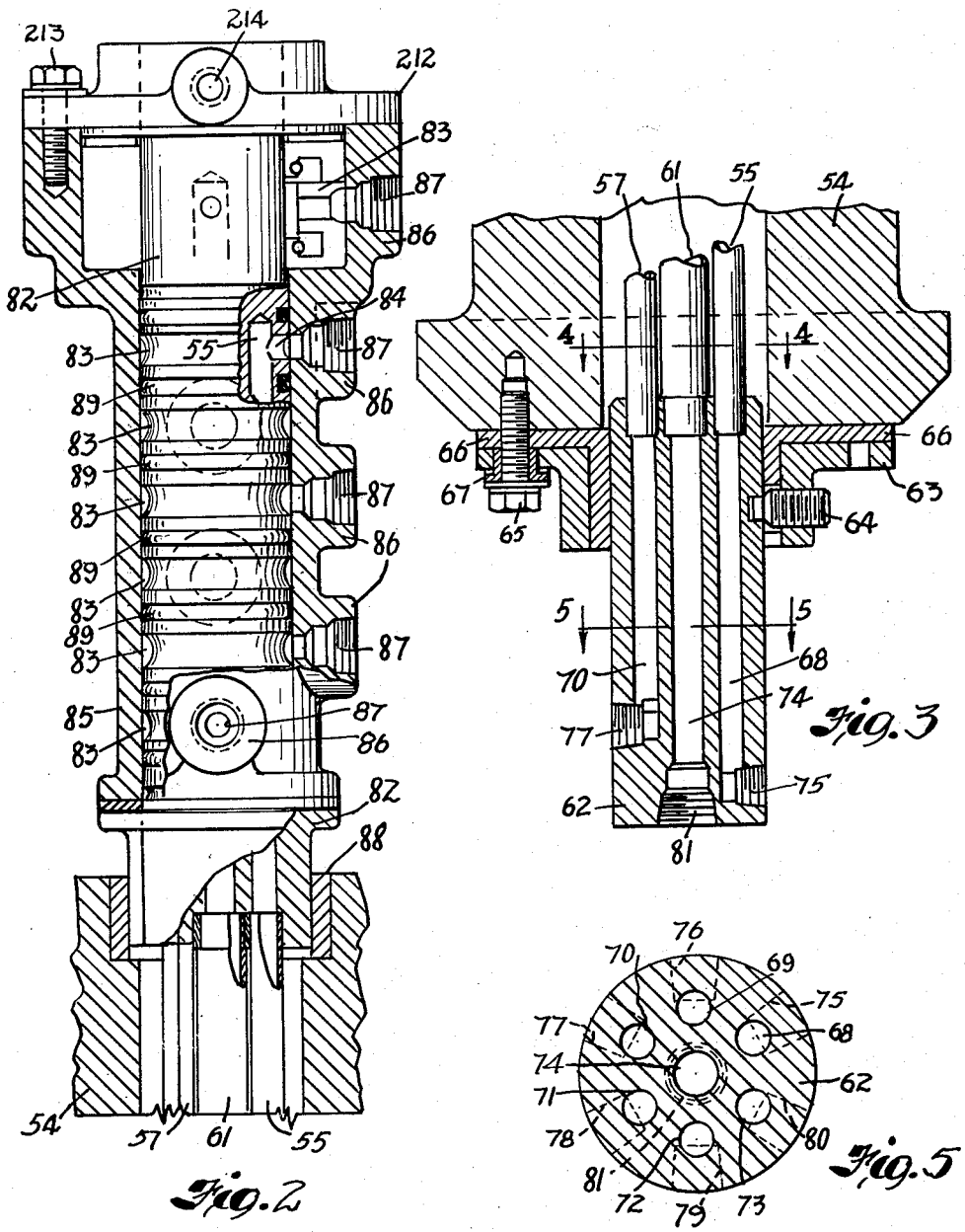

Nov. 8, 1960  P. JOHNSON ET AL  2,959,260
DUAL CONTROL SYSTEM FOR CRANES AND THE LIKE
Filed Oct. 17, 1955  8 Sheets-Sheet 4
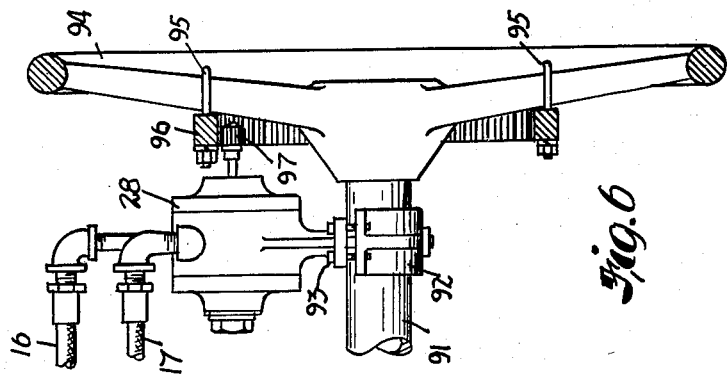
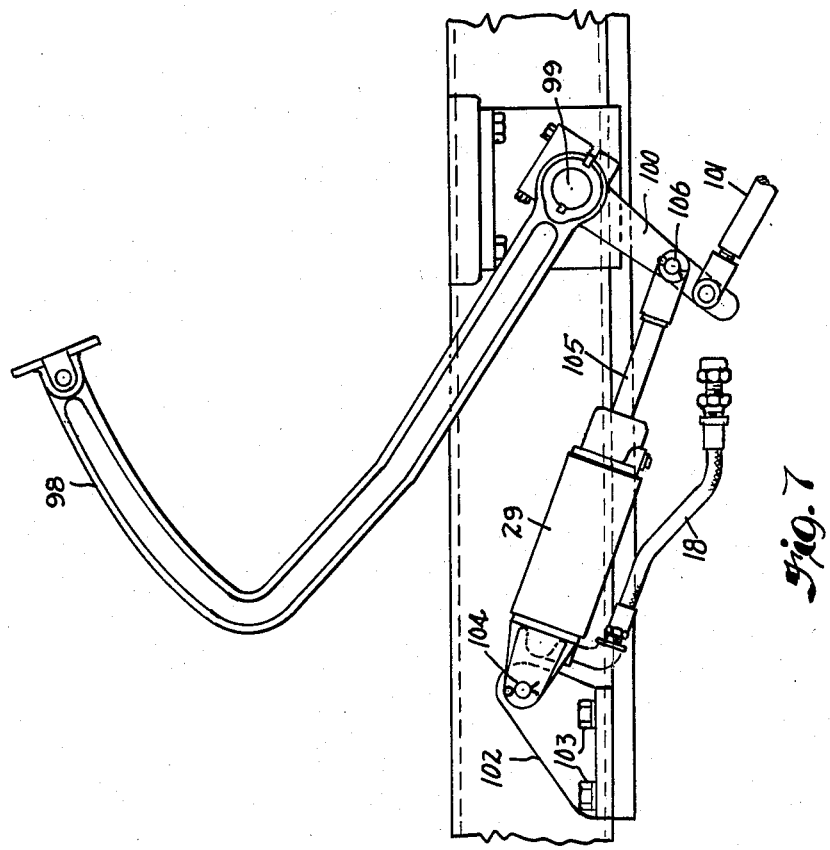
INVENTORS
PAUL JOHNSON AND
BY ROY H. ZEILMAN
Oberlin & Limbach
ATTORNEYS Nov. 8, 1960 P. JOHNSON ET AL 2,959,260
DUAL CONTROL SYSTEM FOR CRANES AND THE LIKE
Filed Oct. 17, 1955 8 Sheets-Sheet 5
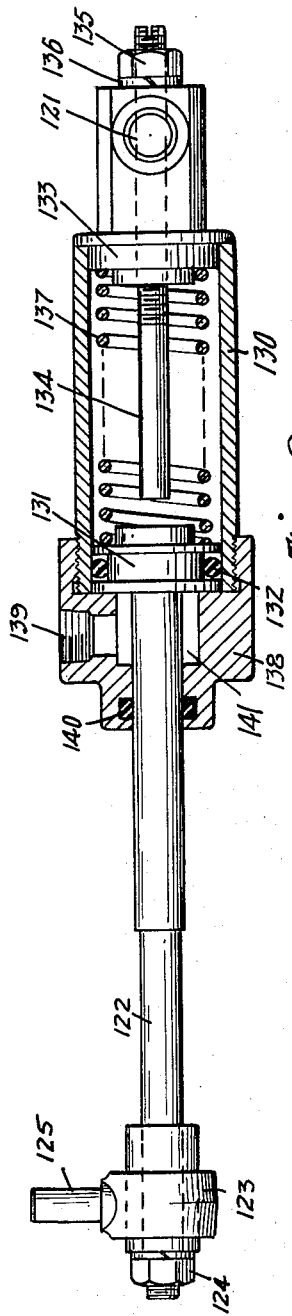
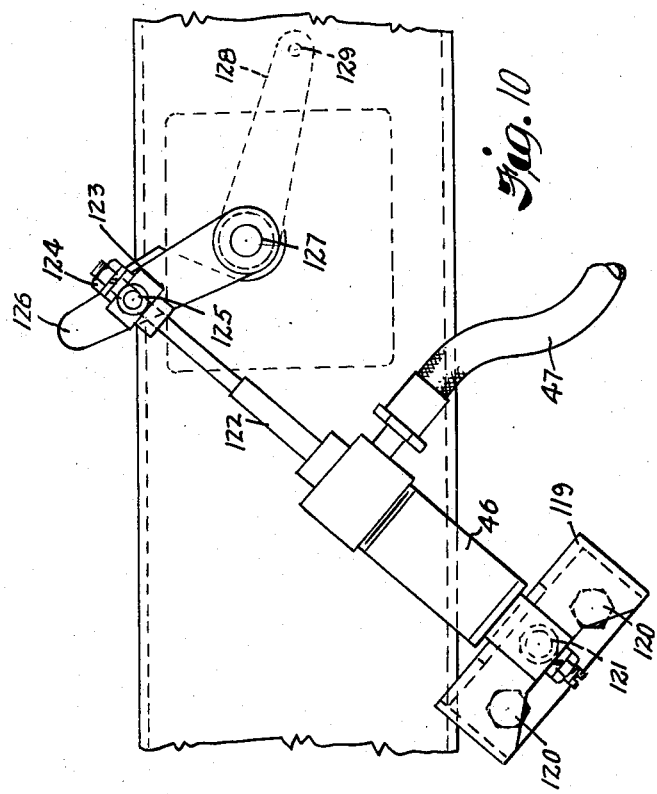
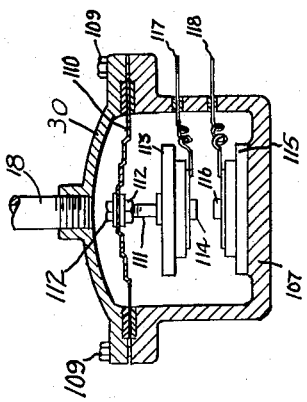
INVENTORS
PAUL JOHNSON AND
BY ROY H. ZEILMAN
Oberlin & Limbach
ATTORNEYS.

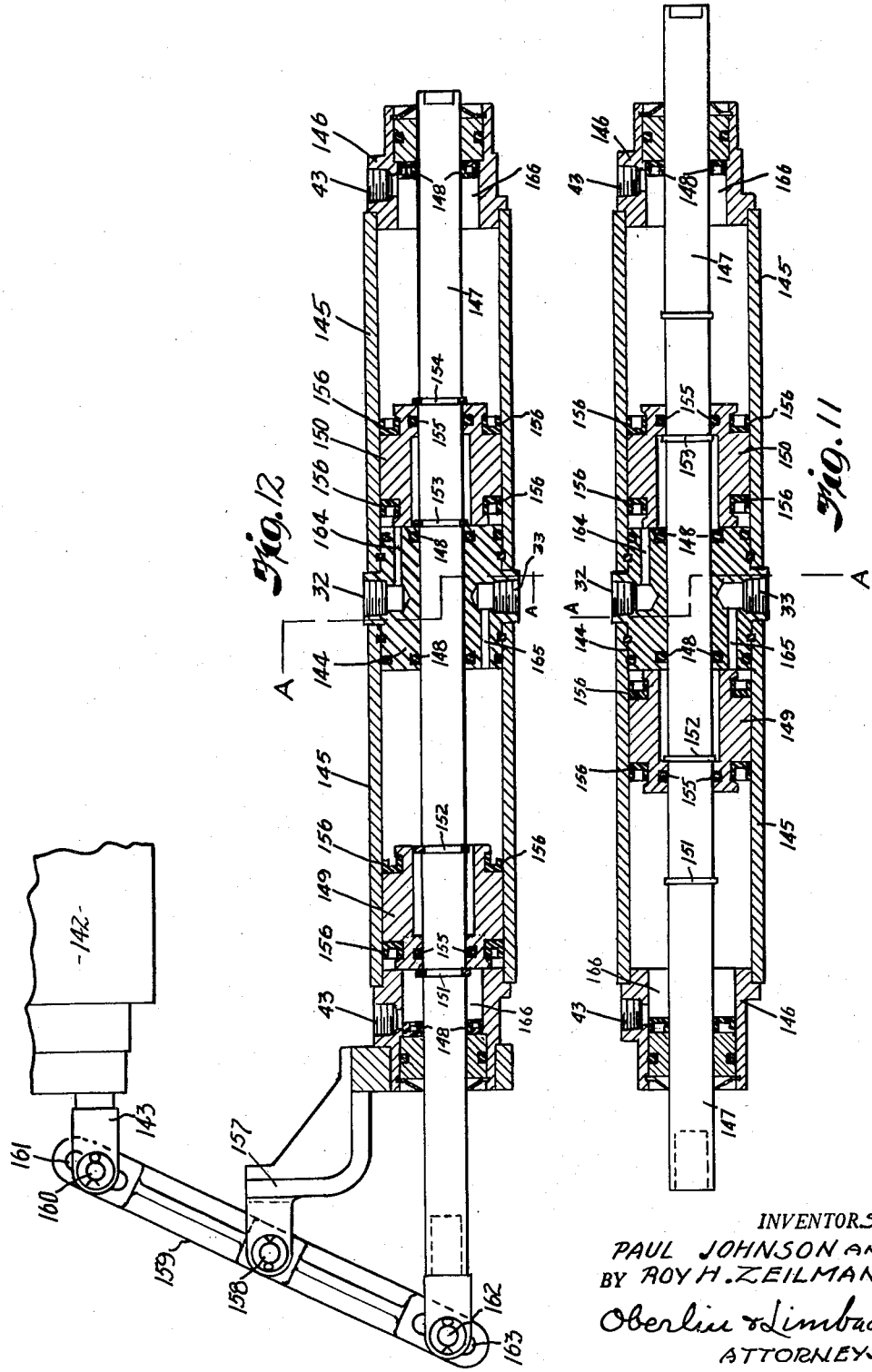

Nov. 8, 1960  P. JOHNSON ET AL  2,959,260
DUAL CONTROL SYSTEM FOR CRANES AND THE LIKE
Filed Oct. 17, 1955  8 Sheets-Sheet 7

INVENTORS
PAUL JOHNSON AND
BY ROY H. ZEILMAN

Oberlin + Limbach
ATTORNEYS.

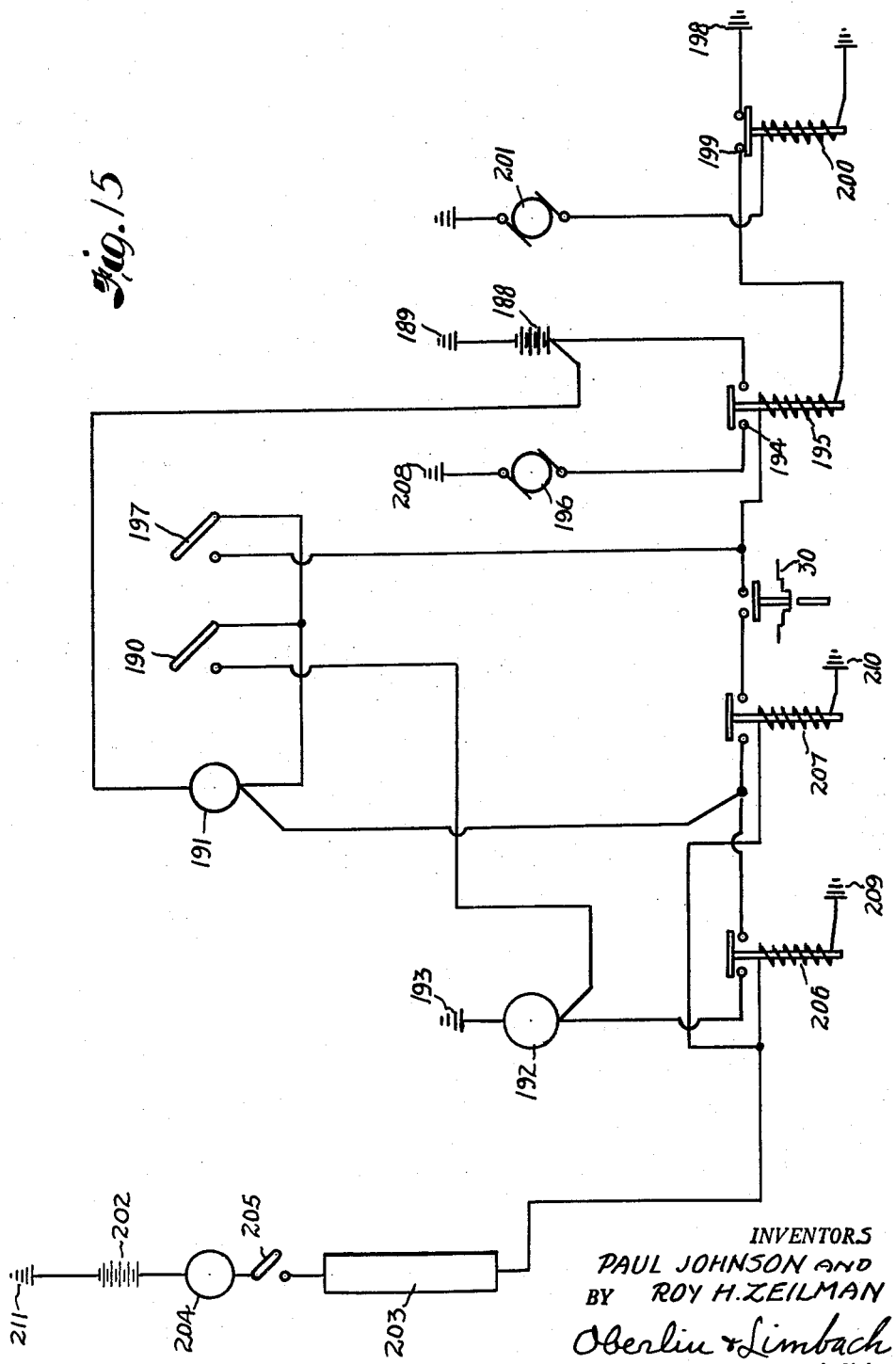

United States Patent Office 2,959,260
Patented Nov. 8, 1960

2,959,260

DUAL CONTROL SYSTEM FOR CRANES AND THE LIKE

Paul Johnson and Roy H. Zeilman, Elyria, Ohio, assignors to The Thew Shovel Company, Lorain, Ohio, a corporation of Ohio Filed Oct. 17, 1955, Ser. No. 540,913

8 Claims. (Cl. 192—3)

This invention relates to a dual control system for self-propelled vehicles which comprise a frame having thereon a cab and a turntable, transportation of said vehicle generally being controlled from the cab, and the working operations of the vehicle are controlled from a housing on the turntable.

When vehicles of the above type such as cranes, power shovels and the like are operated to perform the various jobs for which they are designed, it is often desirable to move the vehicle from one position to another while the job is being performed. When such is the situation it is very inconvenient for the machine operator to get out of the housing on the turntable of the vehicle, get into the cab, operate the controls of the vehicle to move it and then return to the housing to continue operating the working portions of the vehicle.

It is, therefore, the principal object of this invention to provide a control system for self-propelled turntable vehicles whereby transportation of the vehicle can be initiated and controlled from the housing on the turntable.

It is a more specific object of this invention to provide a control system of the type described wherein the controlling elements extending from the housing to the cab of the vehicle cannot become tangled or damaged by rotation of the housing with respect to the frame.

It is a further object of this invention to provide a control system for the transmission of the vehicle whereby the transmission can be shifted into either low or reverse and whereby the control system will shift the transmission into neutral automatically when either the low shifting or reverse shifting control on the turntable is de-energized.

It is a further object of this invention to provide a control system for the starting circuit of the vehicle engine whereby the engine cannot be started when the clutch between the engine and the transmission is engaged.

It is a further object of this invention to provide a control system for the throttle of the vehicle engine whereby the speed of the vehicle engine will be increased to an adjustable predetermined point when the vehicle's brakes are released.

It is a further object of this invention to provide a single wire electrical control system operable from the housing on the turntable whereby the ignition and starting switches of the vehicle engine can be shorted out.

Other objects of the invention will appear as the description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In the annexed drawings:

Fig. 2 is a side elevational view partially in section of the upper part of the rotary seal on the turntable of the vehicle;

Fig. 3 is a side elevational view partially in section of the lower end of this rotary seal;

Fig. 5 is a cross-sectional view of the apparatus illustrated in Fig. 3 taken along the plane and in the direction substantially indicated by the line and the arrows at 5—5 in Fig. 3;

Fig. 6 is a side elevation partially in section of the steering control apparatus of this invention;

Fig. 7 is a side elevational view of the clutch actuating means of this invention;

Fig. 8 is a cross-sectional view of the safety switch of this invention;

Fig. 9 is a cross-sectional view of the pneumatic cylinder by which the throttle of the vehicle is actuated in the invention;

Fig. 10 is a side elevational view of the mounting of the cylinder illustrated in Fig. 9;

Fig. 11 is a longitudinal cross-sectional view of the transmission shifting cylinder of this invention here shown in the neutral position;

Fig. 12 is a view similar to Fig. 11 here showing the cylinder in its low position;

Fig. 15 is a diagram of the electrical circuit employed in this invention.

Broadly stated our invention comprises a dual control system for motor cranes and the like whereby, in addition to complete control of the vehicle's transportation effected from a cab on the vehicle's frame, control of the vehicle's starting and ignition switches, clutch, brakes, steering, accelerator and low and reverse transmission shifting may be effected from the turntable of the vehicle.

Figure 1A:
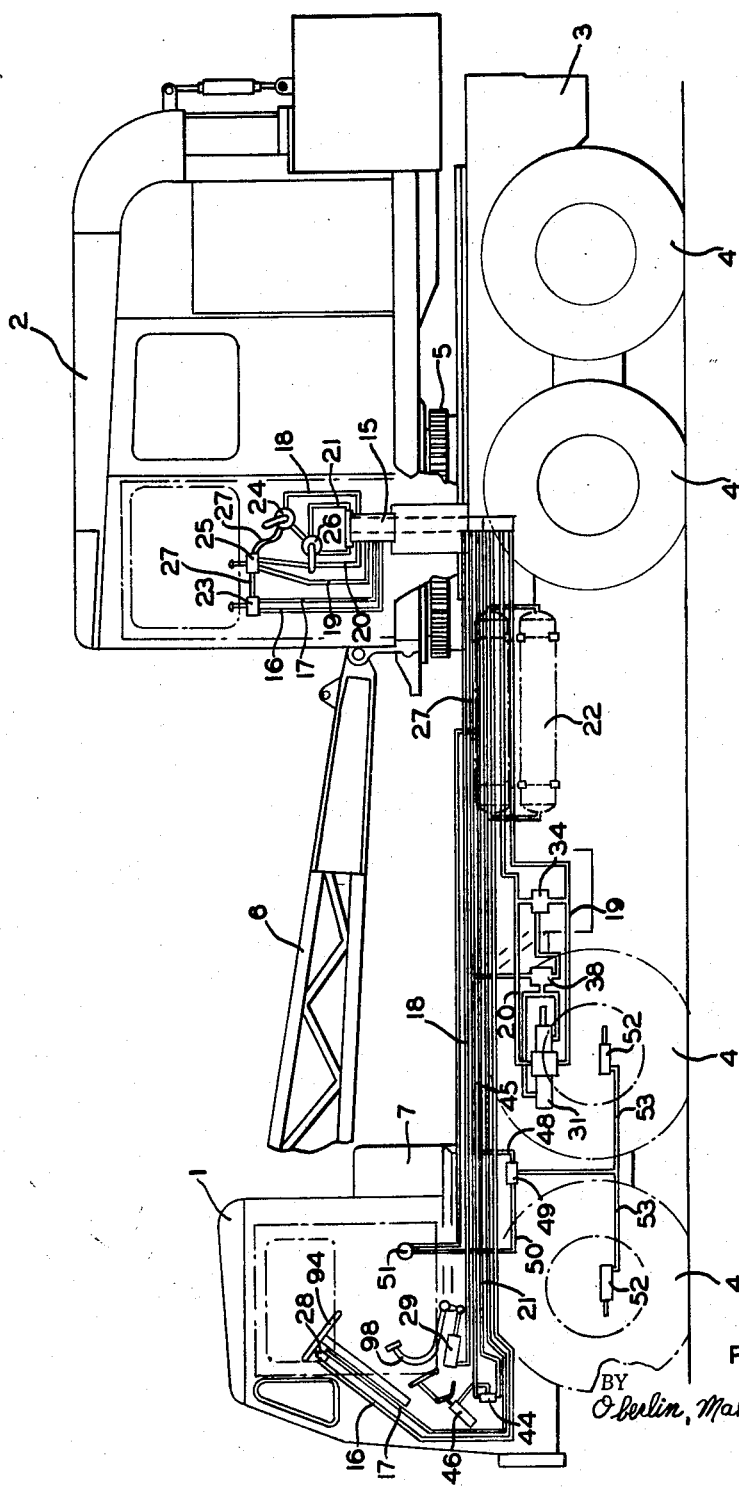
Fig. 1A is a side elevational view of a vehicle partially broken away illustrating schematically the various pneumatically controlled components of our control system.

Fig. 1A illustrates the vehicle or motor crane with the components of our control system shown therein schematically. The vehicle driver's cab 1 and the crane cab 2 are supported on a vehicle frame 3 having ground engaging wheels 4. The crane cab is supported on turntable 5 and a crane boom 6 is pivotally mounted at the forward end thereof. The carrier is powered by a prime mover 7 to drive the carrier for movement through a transmission as hereinafter described.

Figure 1:
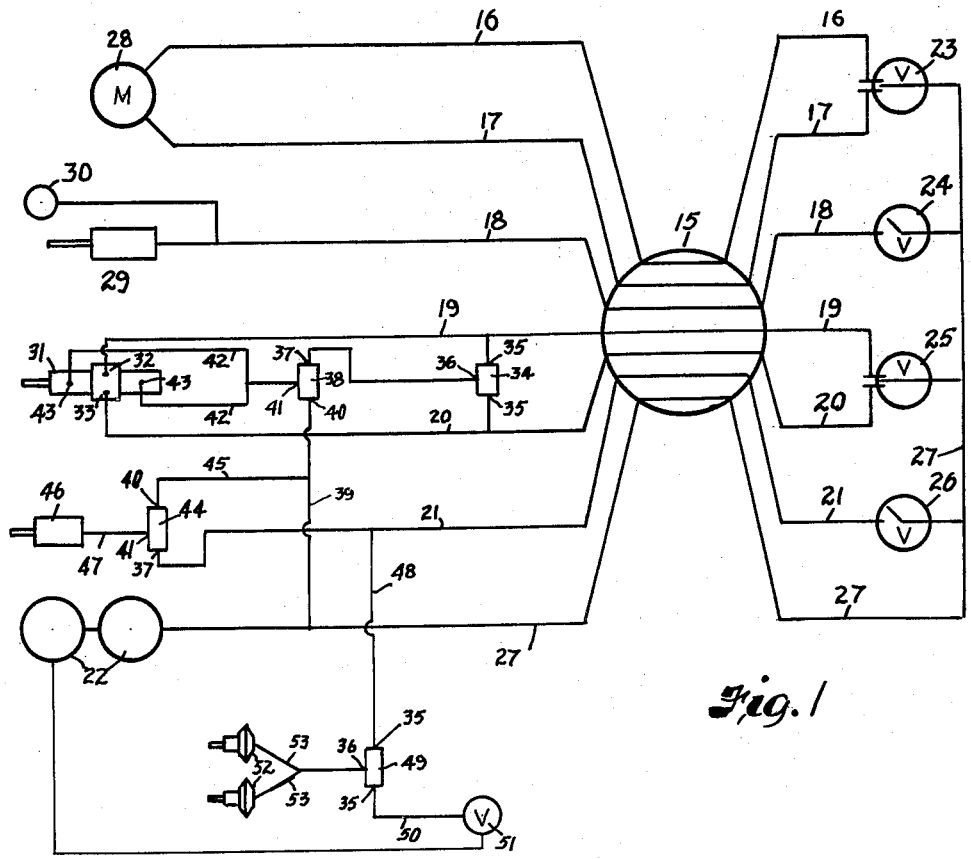
Fig. 1 is a schematic diagram of the pneumatic portion of the control system of our invention.

With reference now to the annexed drawings and particularly to Figs. 1 and 1A, 15 indicates a rotary seal, illustrated in detail in Figs. 2, 3, 4 and 5, through which the conduits 16, 17, 18, 19, 20 and 21 may be connected to a reservoir 22 of pressurized fluid through valves 23, 24, 25 and 26 which are connected to the supply conduit 27. Each of the valves 23 and 25 comprises a pair of poppet valves actuated by one leevr such that both of the valves of each pair may be closed at one time, or either one or the other may be opened, but both of the valves of one pair cannot be opened at one time. A suitable valve of this type is described in U.S. Patent No. 2,345,224. The valves 24 and 26 are of the type wherein the degree of pressure supplied to the delivery conduit of the valve is proportional to the deflection from normal of the valve-actuating lever; a suitable valve of this type is that sold by Bendix-Westinghouse Air Brake Co. under manufacturer's part number 217,454.

Figure 13:
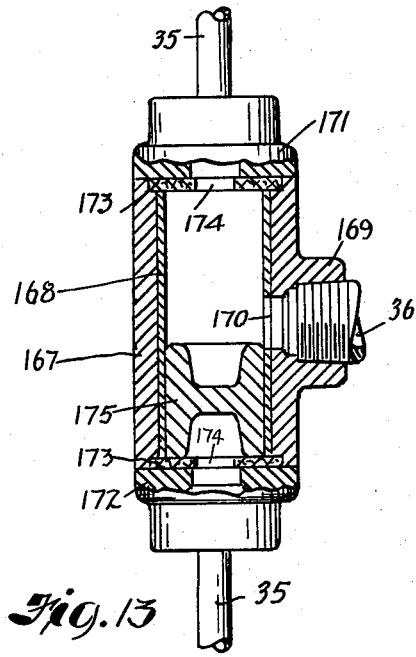
Fig. 13 is a cross-sectional view of the double check valve used in this invention.

In Fig. 1, 28 designates an air motor, illustrated in Fig. 6, by which the steering mechanism of the vehicle is controlled. As illustrated, the conduits 16 and 17 are connected to the motor 28. A clutch-actuating cylinder 29, illustrated in Fig. 7, and a safety switch 30, illustrated in Fig. 8, are connected to the conduit 18. 31 designates generally the transmission shifting cylinder of our invention which is illustrated in Figs. 11 and 13, and in which ports 32 and 33 are connected respectively to conduits 19 and 20. A double check valve 34, illustrated in Fig. 12, is provided, the supply conduits 35 of which are connected to the conduits 19 and 20, and the delivery conduit 36 of the valve 34 is connected to the supply conduit 37 of a spring-loaded pressure relief valve 38 illustrated in detail in Fig. 14. A branch conduit 39 is connected between the conduit 27 and the supply conduit 40 of the valve 38. The outlet conduit 41 of the valve 38 is connected to two conduits 42 which are connected to the ports 43 of the transmission shifting cylinder 31. The conduit 21 is connected to the supply conduit 37 of a spring-loaded pressure relief valve 44, similar to the valve 38 described above, and a further banch conduit 45 is connected between the branch conduit 39 and the supply conduit 40 of the valve 44. A throttle control cylinder 46, illustrated in Figs. 9 and 10, is connected to the conduit 41 of the pressure relief valve 44 by a conduit 47. Connected to the conduit 21 is a conduit 48 the other end of which is connected to one of the conduits 35 of a double check valve 49, which is similar to the valve 34 described above. Connected to the other supply conduit 35 of the valve 49 is a conduit 50 connected at its other end to the conventional pneumatic valve 51 by which the vehicle's brakes are actuated from the cab. The conventional brake cylinders 52 of the vehicle are connected to the delivery conduit 36 of the valve 49 by suitable conduits 53.

Figure 4:
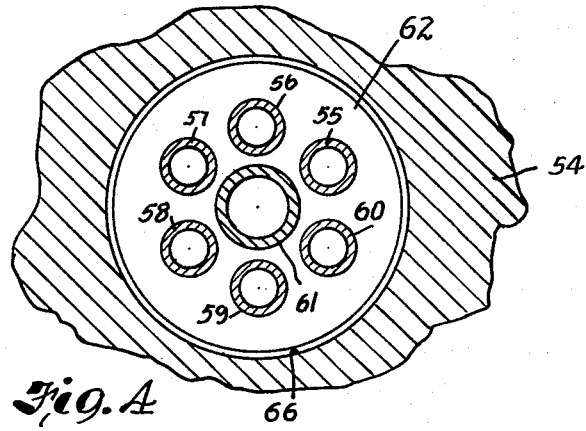
Fig. 4 is a cross-sectional view of the apparatus illustrated in Fig. 3 taken along the plane substantially indicated at 4—4.

With reference now to Figs. 2, 3, 4 and 5 wherein the rotary seal of my invention is illustrated, 54 designates a shaft extending through the stationary portion of the turntable of the vehicle. Extending axially through the shaft 54 are seven passages 55, 56, 57, 58, 59, 60 and 61. These passages are preferably the passages inside seven pipes as illustrated in Fig. 4 but may be the passages afforded by seven cylindrical holes extending axially through an otherwise solid shaft. A cylindrical member 62 is provided at the bottom of the shaft 54 and is secured to the shaft 54 by a metal collar 63 and a set screw 64. A plurality of screws 65 secure the collar 63 to the shaft 54, and the collar 63 and the member 62 are electrically insulated from the shaft 54 and the screws 65 by means of a bakelite collar 66 and bakelite plugs 67. The member 62 is provided with seven axially extending passages 68, 69, 70, 71, 72, 73 and 74 to which the passages 55, 56, 57, 58, 59, 60 and 61 respectively are connected. The passages 68, 69, 70, 71, 72, 73 and 74 terminate in the threaded passageways 75, 76, 77, 78, 79, 80 and 81 respectively. The conduits 55, 56, 57, 58, 59, 60 and 61 terminate at their upper ends in a head 82 which contains on its periphery seven circumferentially extending grooves 83, each of which is connected to one of the conduits 55 through 61 by a passageway 84. A sleeve 85 telescopically engaged with the head 82 is provided having seven bosses 86 thereon, each of said bosses containing a threaded port 87 therein adapted to receive the conduits leading to the valves 23, 24, 25 and 26. Each of the ports 87 is connected to one of the spaces bounded by the inner wall of the sleeve 85 and the surfaces of the depressions 83. Sealing rings 89 between the head 82 and the sleeve 85 are carried by the head 82 adjacent the edges of the depressions 83. It should be noted that some means should be provided whereby the sleeve 85 can be secured to the turntable. For this reason, the ring 212 is provided on the sleeve 85 and secured thereto by a plurality of bolts, one of which is illustrated at 213. Two holes 214 are provided in the ring 212 whereby the ring 212 may be secured to a suitable bracket which is in turn secured to the body of the housing. It should be noted that a bakelite sleeve 88 is provided electrically insulating the shaft 54 from the head 82.

Since the cluster of conduits 55 through 61 and the head 82 and the member 62 are electrically insulated from the shaft 54 in the turntable, a wire is connected to the sleeve 85 and another wire to the member 62 so that the combination of the sleeve 85, the head 82, the pipes 55 through 61 and the member 62 form part of the conductor for the single wire electrical circuit of our invention, permitting use of the frame and turntable of the vehicle as the return circuit.

It should be noted that the braket which secures the ring 212 to the turntable must be insulated from the turntable.

It should further be noted that if the rotary seal is constructed as suggested above by forming the conduits 55 through 61 as passageways through the shaft 54, the shaft 54 must be electrically insulated from the turntable.

With reference now to Fig. 6 wherein is illustrated the steering control apparatus of my invention, 28 designates a two-directional air motor driven by air supplied from the conduits 16 and 17 referred to above. A suitable air motor for this purpose is produced by Gast Mfg. Corporation under manufacturer's part No. 4–AM–FRV–13. The air motor 28 is mounted on the steer-column 91 in the vehicle cab by means of a bracket 92 and bolts 93. Mounted on the steering wheel 94 of the vehicle by means of U-bolts 95 is a ring gear 96, the inner periphery of which contains teeth adapted to receive a pinion gear 97 on the air motor 28. The lines 16 and 17 are connected to the double poppet valve 23 through two of the conduits 55 through 60 of the rotary seal illustrated in Figs. 2 through 5.

With reference now to Fig. 7, 98 designates the clutch pedal in the vehicle cab which is pivotally secured to the vehicle frame by means of the shaft 99 and which is rigidly connected to a rocker arm 100 to the end of which is pivotally secured a clutch actuating lever 101. A support member 102 is secured to the frame of the vehicle by meanes of bolts 103 and a pneumatic piston cylinder combination 29 is pivotally secured to the member 102 by means of a pin 104. The piston rod 105 of the combination 29 is pivotally secured to the rocker arm 100 by means of pin 106. Leading from the combination 29 is the conduit 18 which is connected to one of the graduated valves 24 through one of the conduits 55 through 60.

With reference now to Fig. 8 wherein is illustrated the pneumatic switch 30 of Fig. 1, 107 designates the solid base portion of the switch and 30 designates a dome cap which is secured to the base 107 by means of bolts 109. Sealed between the cap 30 and the base 107 is a steel diaphragm 110 to the center of which a shaft 111 is secured by means of bolts 112. Carried on the lower end of the shaft 111 is a sheet of bakelite insulation 113 to the bottom of which is attached an electrical contact 114. Mounted in the base 107 of the switch is a sheet of bakelite insulation 115 to the top of which is mounted an electrical contact 116. Lead wires 117 and 118 leading through the switch body 107 are connected respectively to the contacts 114 and 116.

With reference now to Figs. 9 and 10, a bracket 119 is attached to the frame of the vehicle by means of bolts 120 and the pneumatic cylinder 46 is pivotally secured to the bracket 119 at 121. The piston rod 122 of the cylinder 46 carries thereon a sliding sleeve 123 which is prevented from slipping off of the rod 122 by a bolt 124. A pin 125 carried by the sleeve 123 engages in a hole in one arm 126 of a double rocker arm which is pivotally secured to the vehicle frame at 127. The other arm 128 of the rocker arm contains a hole 129 to which is connected a pusher rod, the other end of which is attached to the fuel inlet control on the carburetor of the vehicle.

It should be noted that the cylinder 46 acts on the rocker arm in only one direction, that is tending to rotate the rocker arm counterclockwise as illustrated in Fig. 10, and the rocker arm is rotated in the clockwise direction by suitable resilient means associated with the pusher rod or the carburetor which are usually employed in such vehicles.

The cylinder 46 herein illustrated is shown in cross section in Fig. 9 and comprises a cylindrical body portion 130 having a piston 131 reciprocable therein. The piston 131 carries a seal 132 adjacent the wall of the body 130. One end of the body 130 is closed by a cap 133 into which is threaded a rod 134 which carries on its outer end a nut 135 and lock washer 136. Mounted in the body 130 between the cap 133 and the piston 131 is a compression spring 137. Screwed onto the end of the body 130 is a cap 138 which contains a threaded port 139 in the side thereof into which the conduit 47 is threaded. Extending axially through the cap 138 is the piston rod 122, and the cap 138 carries a seal 140 adjacent the rod 122. The port 139 communicates with a chamber 141 inside the cap 138 and adjacent the piston 131.

With reference now to Figs. 11 and 12, 142 designates a fragment of the body of the conventional vehicle transmission in which changes in gear ratio are effected by axial movement of a shaft 143. Mounted on the frame of the vehicle by any suitable means is the transmission shifting cylinder illustrated generally at 31 in Fig. 1. This transmission shifting cylinder comprises a central body member 144 to each side of which is attached by any suitable means a cylinder 145. The remote ends of the cylinders 145 are closed by means of heads 146 which contain axially extending passageways therein adapted to receive a rod 147. The central body member 144 also has an axially extending passageway therethrough which embraces the rod 147. The body member 144 and the heads 146 carry seals 148 adjacent the periphery of the rod 147. Mounted on the rod 147 are two pistons 149 and 150, one on either side of the central body member 144. The movements of the pistons 149 and 150 with respect to the rod 147 are limited by means of snap rings 151, 152, 153 and 154 on the rod 147. The pistons 149 and 150 carry seals 155 adjacent the periphery of the rod 147 and seals 156 adjacent the inner periphery of the cylinders 45. Extending from one end of the transmission shifting cylinder is an arm 157 to which is pivotally secured at 158 a rocker arm 159. The shaft 143 of the transmission 142 is secured to the rocker arm 159 by means of a pin 160 extending into an elongated slot 161 in the rocker arm 159. The end of the rod 147 is connected to the other end of the rocker arm 159 by a pin 162 which extends into an elongated slot 163 in the arm 159. Extending into the central body member 144 are the threaded ports 32 and 33 referred to in connection with Fig. 1. Extending from the port 32 through the side of the body 144 adjacent the piston 150 is a passageway 164, and extending from the port 33 through the side of the body 144 adjacent the piston 149 is a passageway 165. It should be noted that the ports 43 referred to above extend into the caps 146 on the cylinders 45 and terminate in recesses 166 in the interior of said caps.

With reference now to Fig. 13 wherein a double check valve employed at 34 and 49 in Fig. 1 is illustrated, 167 designates the body of the valve; 168 designates the lining of the body and 169 designates a centrally-disposed boss on the body 167, said boss containing an internally threaded port 170 into which the conduit 36 referred to above is engaged. It should be noted that the port 170 extends through the lining 168. Covering the opposite ends of the body 167 are two caps 171 and 172 from which extend the conduits 35 referred to above. The caps 171 and 172, secured to the body 167 by any suitable means, hold in recesses in the ends of the body 167 two sealing washers 173 which are provided with centrally-disposed ports 174. Slidably mounted inside the liner 168 is a shuttle member 175.

Figure 14:
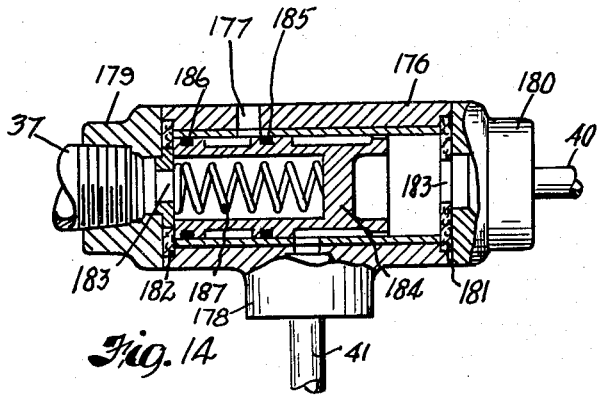
Fig. 14 is a cross-sectional view of the spring loaded pressure relief valve used in this invention.

With reference now to Fig. 14 wherein is illustrated the spring-loaded pressure relief valve referred to at 44 and 38 in Fig. 1, 176 designates the body of the valve having extending therethrough an exhaust port 177. Centrally located on the body 176 is a boss 178 from which extends the conduit 41 referred to above. Two caps 179 and 180 are provided on the ends of the body 176 and have extending respectively therefrom the conduits 37 and 40 referred to above. The caps 179 and 180, secured to the body 176 by any suitable means, hold sealing discs 181 and 182 into recesses in the ends of the body 176. The sealing discs 181 and 182 are provided with centrally-disposed ports 183. Mounted inside body 176 is a piston 184 having two peripheral portions 185 and 186 which carry seals adjacent to the inner wall of the body 176. Mounted between the piston 184 and the washer 182 is a compression spring 187. The portions 185 of the piston 184 are so located that when the piston contacts the washer 182 as indicated in Fig. 14, the valve will connect the conduit 41 to the conduit 40 and when the piston contacts the washer 181, the space between the portions 185 and 186 will connect the conduit 41 to the exhaust port 177.

With reference now to Fig. 15 wherein is illustrated the wiring diagram of our invention, 188 designates the usual storage battery in a vehicle of this type, the negative pole of which is grounded to the frame of the vehicle at 189. Connected in series with the battery 188 through the ignition switch 190 and the ammeter 191 is a coil 192, the other terminal of which is grounded to the frame at 193. Connected in series with the battery 188 through the poles 194 of a solenoid switch 195 is one terminal of a starting motor 196, the other terminal of which is grounded to the frame of the vehicle. Connected in series with the battery 188, through the starting switch 197 and the ammeter 191 is the solenoid switch 195. This circuit is grounded to the frame at 198 through the terminals 199 of a solenoid switch 200. The solenoid of the solenoid switch 200 is connected across the generator 201, the negative terminal of the generator 201 being grounded to the frame of the vehicle. It should be noted that the solenoid switch 195 is generally opened and closed only when the switch 197 and the solenoid switch 200 are closed; also the solenoid switch 200 is generally closed and opened only when current is supplied thereto from the generator 201.

202 designates a storage battery mounted in the housing on the turntable of the vehicle, the negative terminal of which is grounded to the turntable which in turn is connected to the frame through the conventional ball-bearing arrangement employed in vehicles of this type. As described above, central means extending through the turntable are electrically insulated from the turntable by means of Bakelite rings and the like. In this electrical diagram 203 indicates generally the insulated means in the turntable. The positive terminal of the battery 202 is connected to an ammeter 204 which in turn is connected to a switch 205. The switch 205 is connected to the top of the means 203 and two solenoid switches 206 and 207 are connected to the bottom of the means 203. The switch 206 is generally open, and when the switch 205 is closed energizing it, it closes shorting out the switch 190. The switch 30 referred to above and illustrated in detail in Fig. 7 which is operated when the clutch is disengaged is illustrated diagrammatically at 30 in this figure. The switch 30 and the solenoid switch 207 are connected in series so as to short out the switch 197 when they are both closed.

When it is desirable to steer the vehicle from the housing on the turntable, the double poppet valve 23 is actuated to connect either of the lines 16 or 17 to the supply line 27. Delivery of fluid under pressure to the lines 16 or 17 causes rotation of the pinion gear 97 of the air motor 28, said rotation being in one direction when the line 16 is energized and in the other direction when the line 17 is energized. As the pinion gear 97 rotates it will, through the ring gear 96, turn the steering wheel of the vehicle.

When it is desirable to disengage the clutch of the vehicle, the graduated valve 24 is opened wide delivering reservoir pressure to the conduit 18. Fluid under pressure delivered to the conduit 18 effects expansion of the clutch actuating cylinder 29 and resulting disengagement of the clutch actuating cylinder 29 and resulting disengagement of the transmission of the vehicle from the engine. The fluid pressure in the conduit 18 also closes the switch 30. The graduated valve 24 is used in this position instead of a poppet valve in order that the clutch 29 may be released slowly.

When the operation of the vehicle is begun from the turntable housing, the graduated valve 26 is opened wide delivering full reservoir pressure to the conduit 21. The pressure in the conduit 21 causes the double check valve 49 to seal the flow line 50 and deliver fluid pressure to the brake cylinders 52. Furthermore, fluid pressure in the line 21 delivered to the conduit 37 of the spring-loaded pressure relief valve 44 with the aid of the resiliency of the spring 187 moves the valve member 184 of the valve 44 to the right as illustrated in Fig. 13 so that the space between the portions 185 and 186 of the piston 184 connects the delivery line 41 of the valve with the atmospheric vent 177. Venting of the conduit 41 thus vents the conduit 47 which permits the escape of fluid from the port 139 of the throttle control cylinder in Fig. 8. Upon venting of port 139, the resiliency of the spring 137 forces the piston 131 and piston rod 122 out of the cylinder 46. As the piston rod 122 moves out of the cylinder 46, the resiliency of a suitable spring associated with the pusher rod which is connected to the rocker arm 128 at 129 causes said rocker arm to rotate so that the intake controls on the vehicle carburetor will reduce the speed of the vehicle engine. It should be noted that the sleeve 123 on the rod 122 is slidably mounted on the rod in order that the rocker arm 126 and 128 may be rotated manually from the vehicle cab without moving the piston 131 of the cylinder 46. When the transmission of the vehicle has been shifted into the desired gear, the graduated valve 26 is closed, reducing the pressure in the line 21. Reduction of pressure in the line 21 permits fluid pressure in the brake cylinders 52 to escape through the double check valve 49 into the line 21 and also permits the reservoir pressure at the conduit 40 of the spring-loaded pressure relief valve to move the piston 148 of said valve against the resiliency of the spring 187. The piston 184 is moved until its end contacts the washer 182 in Fig. 13 whereby the portion 185 of the piston seals the conduit 41 from the atmospheric vent 177 and the valve connects the reservoir supply conduit 40 to the conduit 41. Fluid under pressure delivered to the conduit 41 is conducted by the conduit 47 to the port 139 of the throttle actuating cylinder 46 illustrated in Fig. 8. Pressure delivered to the port 139 forces the piston 131 against the resiliency of the spring 137 moving the piston to the right as illustrated in Fig. 9 until it contacts the rod 134. It should be noted that the rod 134 may be screwed into and out of the cap 133 of this cylinder so that the point at which the piston 131 will be stopped may be adjusted. As the piston 131 moves toward the rod 134, the sleeve 123 which is retained on the rod 122 by the bolt 124 will rotate the arm 126 in Fig. 10 which will result in rotation of the arm 128 and ensuing movement of the pusher rod associated therewith. The pusher rod will cause the speed of the engine to be increased to a point proportional to the position of the end of the rod 134 in the cylinder 46.

It should be noted that the graduated valve 26 is employed to actuate the brake cylinders 52 in order that the brakes may be applied gradually.

When it is desirable to shift the transmission of the vehicle from the housing on the turntable, the valve 25 is actuated to connect either the conduit 19 or the conduit 20 to the supply conduit 27. When either of the lines 19 or 20 is energized, fluid pressure is delivered to the double check valve 34, so that the piston 175 of said valve seals the conduit 35 which is connected with the unenergized conduit 19 or 20, and permits fluid flow into the conduit 36 from whence it flows to the conduit 37 of the spring-loaded pressure relief valve 38. When fluid under pressure is delivered to the conduit 37 illustrated in Fig. 14, said pressure and the resiliency of the spring 187 moves the piston 184 against the washer 181 and hence preventing fluid flow from the conduit 40 to the conduit 41 and connecting the conduit 41 to the atomospheric vent 177. The conduit 41 as illustrated is connected to the ports 43 at the ends of the transmission shifting cylinder 31 illustrated in Figs. 11 and 12. Fluid under pressure is thus permitted to escape from the areas in the cylinder 41 between the pistons 149 and 150 and the ends of the cylinder. As the fluid under pressure is delivered to the line 20 by the valve 25, fluid flows into the cylinder 31 through the port 33 and since fluid pressure is relieved from opposite ends of the cylinder 31 by means of the pressure relief valve 38 described above, the fluid pressure supplied to the port 33 will force the piston 149 to the left from its position illustrated in Fig. 12. As the piston 149 moves to the left, it will contact the snap ring 151 and further movement to the left to the position illustrated in Fig. 12 will effect movement to the left of the rod 147 and hence movement to the right of the shaft 143 of the transmission 142 shifting the transmission into low. When the valve 25 is moved to vent the conduit 20, fluid is permitted to escape from the port 33 of the cylinder 31 and also to escape from the conduit 37 of the spring-loaded pressure relief valve 38. The release of pressure from the valve 38 causes the piston 184 thereof to move to the left as illustrated in Fig. 14 so that the conduit 40 is connected to the conduit 41 and fluid under pressure is supplied to the ports 43 of the transmission shifting cylinder 31. The fluid supplied to the ports 43 will cause the piston 149 to move to the right from its position illustrated in Fig. 11 so that it will contact the snap ring 152 and return the rod 147 to its initial position as illustrated in Fig. 10. Connection of the conduit 19 to the supply conduit 27 will effect movement of the piston 150 similar to the operation described above causing movement to the right of the rod 147 and hence movement to the left of the shaft 143 of the transmission 142 causing the transmission to shift into reverse. When this device is employed on a vehicle wherein the low and reverse gears of the transmission are controlled by opposed axial movements of a rod and the transmission is in its neutral position between its reverse and low positions, the cylinder may be employed alone to shift the transmission from low to neutral to reverse to neutral and so forth as described above. It should be noted that whenever one of the conduits 19 or 20 is vented, the transmission shifting cylinder will automatically shift the transmission back to neutral. In this way jamming of the transmission gears is impossible and fewer control valves in the turntable housing are required.

When our invention is used on a vehicle in which the low and reverse transmission gears are operated by different rods, transmission shifting cylinders similar to the ones illustrated herein may be employed. However, such cylinders need be comparable to only ½ of the cylinders illustrated in Figs. 11 and 12. Thus, a cylinder would be employed for one shifting operation which comprises that portion of the cylinder illustrated in Fig. 11 to the left of the line A—A and a cylinder comprising that to the right of the line A—A would be employed for the other shifting operation. In this case, an apparatus similar to the arm 57 and rocker arm 159 would be employed with the second cylinder also and the connections to the ports 32, 33 and 43 would be the same as is illustrated in Fig. 1.

The operation of the electrical circuit of this invention is as follows. When the vehicle is controlled from its cab, the ignition switch 190 is closed, placing the coil 192 in series with the battery 188, the frame of the vehicle between the grounds 193 and 189 forming the return circuit. The switch 197 is closed completing the circuit from the ground 189, through the battery 188, through the ammeter 191, through the switch 197, through the solenoid of the solenoid switch 195, through the terminals 199 of the switch 200, to the ground 198 and back to the ground 189 through the frame of the vehicle. When this circuit is closed, the solenoid of the solenoid switch 195 is energized closing that switch and connecting the terminals 194 thereof. When the terminals 194 are closed, battery 188 is in series with the starting motor 196 of the vehicle, the return half of this circuit comprising the frame of the vehicle from the ground 208 to the ground 189. The starting motor 196 of the vehicle will run, cranking the motor, until sufficient current is put out by the generator 201 to open the solenoid switch 200. When the solenoid switch 200 opens the circuit through the solenoid of the switch 195 is broken so that the switch 195 opens de-energizing the starting motor 196.

When it is desirable to operate the vehicle motor from the housing on the turntable and the switches 190 and 197 have been left open, the switch 205 on the turntable is closed so that current supplied by the battery 202 flows through the ammeter 204, the switch 205, the rotary seal 203 of the turntable and then through the solenoids of the solenoid switches 206 and 207 closing these switches, the return half of this circuit being provided by the frame and turntable of the vehicle from the grounds 209 and 210 to the ground 211. When the switch 206 closes, it places the coil 192 in series with the battery 188, the frame of the vehicle between the grounds 189 and 193 forming the returning half of the circuit. When the switch 207 closes, current is supplied from the battery 188 through the solenoid of the switch 195 and to the ground 198 through the terminals 199 of the relay 200. This is the case only when the switch 30 is closed. As mentioned above, the switch 30 is the pressure operated switch which is closed only when the vehicle clutch is disengaged by opening the graduated valve 24. When the solenoid switch 195 is closed, the starting motor 196 is placed in series with the battery 188 and will remain in such series cranking and starting the motor until sufficient current is supplied by the generator 201 to open the solenoid switch 200. The switch 30 is provided in this circuit in order that, should the vehicle engine stall, the starting motor 196 will not be immediately energized. Should the starting motor 196 be energized when the clutch of the vehicle is engaged, this motor would burn out since the crane operator on the turntable is so removed from the vehicle engine that he often cannot tell whether the engine is running or not.

Our invention as described above provides a dual control system whereby motor cranes and the like can be operated from the turntable. It will be noted that our invention provides means whereby the vehicle engine can be started, means for disengaging the clutch of the vehicle, means for insuring that the vehicle cannot be started when the clutch is engaged, means for shifting the transmission of the vehicle into either low or reverse gear and shifting it back into neutral after either of said gears is actuated, means for applying the vehicle's brakes, and means for automatically increasing the speed of the vehicle's engine when the brakes are released. With our invention it is possible to control all of these functions from the crane operator's station on the turntable and hence to move the crane from one place to another without leaving the turntable.

Other modes of applying the principle of the invention may be employed, change being made as regards the details described, provided the features stated in any of the following claims, or the equivalent of such, be employed.

We, therefore, particularly point out and distinctly claim as our invention:

1. A remote control system for motor cranes and like mobile equipment of the type that has in the driver's cab thereof a steering wheel, and brake, transmission, clutch, and throttle controls; said system comprising a fluid pressure supply source; a fluid operated motor operatively connected with the transmission of said equipment and having an element movable selectively to shift said transmission to forward gear, reverse gear, and neutral; a remotely situated transmission control valve for selectively moving said element to either of the first two-mentioned positions; conduits leading from said source to said motor via said transmission control valve; and branch conduits and valve means including a double check valve and a spring loaded pressure relief valve to conduct fluid under pressure to said motor to hold said element in neutral position when said transmission control valve is closed and to vent said neutral holding pressure from said motor responsive to movement of said control valve to either of said first two mentioned positions.

2. A remote control system for motor cranes and like mobile equipment of the type that has in the driver's cab thereof a steering wheel, and brake, transmission, clutch, and throttle controls; said system comprising a fluid pressure supply source; a single acting fluid pressure operated motor of which the movable element has one way engagement with the throttle of the engine of said equipment; a valve and conduit through which fluid under pressure is conducted from said source to said motor to move said element in a direction to increase engine speed, said valve having a spring loaded and pressure actuated valve member past which fluid flows to said motor; and a throttle control valve and conduit leading from said source to said valve to conduct fluid under pressure to act on said valve member to render the latter operative to vent said motor and thereby permit the throttle to move to decrease engine speed.

3. A remote control system for motor cranes and like mobile equipment of the type that has in the driver's cab thereof a steering wheel, and brake, transmission, clutch, and throttle controls; said system comprising a fluid pressure supply source; a fluid operated motor operatively connected with the transmission of said equipment and having an element movable selectively to shift said transmission to forward gear, reverse gear, and neutral; a remotely situated transmission control valve for selectively moving said element to either of the first two mentioned positions, a pair of conduits leading from said motor to said control valve and a conduit leading from said control valve to said supply source; a double check valve operatively connected between each said pair of conduits and to a spring loaded pressure relief valve in turn operatively connected to said motor; and a branch conduit connected directly between said source and said relief valve to conduct fluid under pressure to said motor to hold said element in neutral position when said remotely situated transmission control valve is closed, said relief valve and double check valve serving to vent said neutral holding pressure from said motor responsive to movement of said control valve to either of said first two mentioned positions.

4. The system of claim 3 wherein a fluid pressure operated motor is operatively engaged with said throttle; another branch conduit and valve conducts fluid under pressure from said source to said throttle operating motor to operate the engine at full throttle; and a remotely situated throttle control valve and conduit supplies high pressure from said source to the last mentioned valve for operating the engine at reduced speed when the transmission control valve is to be operated.

5. The system of claim 4 wherein yet another branch conduit and brake control check valve have fluid under pressure supplied thereto to operate the brakes of said equipment from said throttle control valve.

6. A remote control system for motor cranes and like mobile equipment of the type that has in the driver's cab thereof a steering wheel, and brake, transmission, clutch, and throttle controls; said system comprising a fluid pressure supply source; a fluid operated motor operatively connected with the transmission of said equipment and having an element movable selectively to shift said transmission to forward gear, reverse gear, and neutral; a remotely situated transmission control valve for selectively moving said element to either of the first two-mentioned positions; conduits leading from said source to said motor via said transmission control valve; and branch conduits and valves to conduct fluid under pressure to said motor to hold said element in neutral position when said transmission control valve is closed and to vent said neutral holding pressure from said motor responsive to movement of said control valve to either of said first two-mentioned positions, said system including a fluid pressure operated motor operatively engaged with said throttle; another branch conduit and valve to conduct fluid under pressure from said source to said throttle operating motor to operate the engine at full throttle; and a remotely situated throttle control valve and conduit supplying high pressure from said source to the last-mentioned valve for operating the engine at reduced speed when the transmission control valve is to be operated.

7. The system of claim 6 wherein yet another branch conduit and brake control check valve have fluid under pressure supplied therethrough to operate the brakes of said equipment from said throttle control valve.

8. A remote control system for motor cranes and like mobile equipment of the type that has in the driver's cab thereof a steering wheel, and brake, transmission, clutch, and throttle controls; said system comprising a fluid pressure source; brake cylinders; a conduit leading from said source to said cylinders; a brake control valve in said conduit; a double check valve in said conduit between said control valve and said brake cylinders operative responsive to actuation of said brake control valve to supply fluid under pressure to apply the brakes of the equipment; said double check valve constituting a portion of the cab control of the brakes also to supply fluid under pressure to said brake cylinders whereby the brakes may be applied either from within the cab or from the location of said brake control valve, the throttle of the engine of said equipment including a single acting fluid pressure operated motor associated therewith of which the movable element has one way engagement with said throttle, and is connected to the pressure conduit between said double check valve and said brake control valve; a spring loaded and pressure operated relief valve ahead of said throttle motor operative to vent the latter for operation of the engine at reduced speed when the brakes are applied through said brake control valve; and another conduit leading from said source to said relief valve for flow of fluid to actuate said throttle motor to increase engine speed when the brakes are released.

References Cited in the file of this patent
UNITED STATES PATENTS

| | | |
|---|---|---|
| 1,365,112 | Line | Jan. 11, 1921 |
| 1,565,421 | Craig | Dec. 15, 1925 |
| 2,075,819 | Manly | Apr. 6, 1937 |
| 2,102,755 | Sinclair | Dec. 21, 1937 |
| 2,112,484 | Eaton | Mar. 29, 1938 |
| 2,193,898 | Carter et al. | Mar. 19, 1940 |
| 2,195,932 | Maloney et al. | Apr. 2, 1940 |
| 2,328,303 | Simpson | Aug. 31, 1943 |
| 2,574,301 | Soule et al. | Nov. 6, 1951 |
| 2,634,621 | Kanuch | Apr. 14, 1953 |
| 2,638,232 | Perkins | May 12, 1953 |
| 2,665,786 | Alcock | Jan. 12, 1954 |
| 2,674,333 | Zeilman et al. | Apr. 6, 1954 |
| 2,705,485 | Morse | Apr. 5, 1955 |
| 2,728,463 | Beckwith | Dec. 27, 1955 |
| 2,761,569 | Iserman | Sept. 4, 1956 |
| 2,781,134 | Weir et al. | Feb. 12, 1957 |